United States Patent
Schnaibel et al.

(10) Patent No.: US 6,216,448 B1
(45) Date of Patent: Apr. 17, 2001

(54) METHOD OF DIAGNOSING AN NOX STORAGE CATALYTIC CONVERTER DURING OPERATION OF AN INTERNAL COMBUSTION ENGINE

(75) Inventors: Eberhard Schnaibel, Hemmingen; Klaus Winkler; Bernd Schumann, both of Rutesheim, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/234,219

(22) Filed: Jan. 19, 1999

(30) Foreign Application Priority Data

Jan. 17, 1998 (DE) .............................................. 198 01 626

(51) Int. Cl.⁷ ........................................................ F01N 3/00
(52) U.S. Cl. ................................. 60/274; 60/277; 60/285
(58) Field of Search .............................. 60/274, 277, 285, 60/286, 303

(56) References Cited

U.S. PATENT DOCUMENTS

| | | |
|---|---|---|
| 3,969,932 | 7/1976 | Rieger et al. . |
| 5,018,348 * | 5/1991 | Durschmidt et al. ................. 60/274 |
| 5,255,515 * | 10/1993 | Blumenstock et al. ................ 60/274 |
| 5,335,538 * | 8/1994 | Bilschke et al. ....................... 60/277 |
| 5,365,216 * | 11/1994 | Kotwick et al. ....................... 60/277 |
| 5,385,016 * | 1/1995 | Zimlich et al. ........................ 60/274 |
| 5,473,887 | 12/1995 | Takeshima et al. . |
| 5,771,685 * | 6/1998 | Hepburn ................................ 60/274 |
| 5,839,274 * | 11/1998 | Remboski et al. ..................... 60/274 |
| 5,899,062 * | 5/1999 | Jerger et al. ........................... 60/274 |

* cited by examiner

Primary Examiner—Teresa Walberg
Assistant Examiner—Fadi H. Dahbour
(74) Attorney, Agent, or Firm—Walter Ottesen

(57) ABSTRACT

The invention is directed to a method and an arrangement for diagnosing a catalytic converter arranged in the exhaust-gas system of an internal combustion engine. The catalytic converter is configured to have an oxygen storage capability and a nitrogen oxide storage capability. A first exhaust-gas probe is mounted rearward of the catalytic converter and a second exhaust-gas probe is mounted forward thereof. The oxygen concentration of the exhaust gas forward of the catalytic converter is alternately increased and decreased so that the signals of both exhaust-gas probes change. A first phase shift between the signals of both exhaust-gas probes is detected when the oxygen concentration increases and a second phase shift between the signals is detected when the oxygen concentration decreases. The difference of the phase shifts is determined and a fault signal is outputted and/or stored when this difference does not reach a pregiven threshold.

9 Claims, 4 Drawing Sheets

METHOD OF DIAGNOSING AN NOX STORAGE CATALYTIC CONVERTER DURING OPERATION OF AN INTERNAL COMBUSTION ENGINE

FIELD OF THE INVENTION

The invention relates to the diagnosis of catalytic converters which are used to convert toxic substances in the exhaust gas of internal combustion engines. The invention especially relates to the diagnosis of an NOx storage catalytic converter during the operation of an internal combustion engine.

BACKGROUND OF THE INVENTION

The three-way catalytic converter no longer satisfies the requirements as to the conversion of nitrogen oxide in the operating region of the combustion of lean air/fuel mixtures ($\lambda>1$). Here, NOx storage catalytic converters are used which store the nitrogen oxides emitted in lean engine operation. Stored nitrates are released and converted to nitrogen by the operation of the engine in the rich region ($\lambda<1$).

The use of NOx storage catalytic converters in this connection is disclosed, for example, in U.S. Pat. No. 5,473,887.

Statutory requirements provide for an on-board diagnosis of the vehicle components, which are relevant to toxic emissions, such as catalytic converters. In this connection, it is known, for example, from U.S. Pat. No. 3,969,932, to apply the signals of oxygen-sensitive exhaust gas probes, which are mounted forward and rearward of the catalytic converter, for evaluating a three-way catalytic converter. The known method is based upon the oxygen storage capability of an operational three-way catalytic converter. In this connection, U.S. Pat. No. 3,969,932 discloses a change of the air/fuel mixture composition from $\lambda=0.95$ (rich, fuel-rich mixture, oxygen deficiency) to $\lambda=1.05$ (lean, fuel-poor mixture, oxygen excess). The exhaust-gas sensor mounted forward of the catalytic converter reacts thereto virtually without delay. The oxygen storage locations of the catalytic converter are at first not occupied because of the oxygen deficiency in the exhaust gas, which is present for $\lambda=0.95$. The oxygen storage locations are successively occupied after the switchover to oxygen excess forward of the catalytic converter. Accordingly, at first there continues to be an oxygen deficiency rearward of the catalytic converter. After a time span, which is dependent upon the oxygen storage capability of the catalytic converter, an oxygen excess also occurs rearward of the catalytic converter which triggers a change of the signal of the rearward exhaust-gas sensor. The time delay, that is, the phase shift between the reactions of both exhaust-gas sensors, is less with decreasing capability of oxygen storage of the catalytic converter and can therefore be used for evaluating the oxygen storage capability for diagnosing the catalytic converter.

This known method is not easily transferrable to a catalytic converter, which in addition to a storage capability for oxygen also has a storage capability for nitrous oxides. Catalytic converters of this kind can usually still store nitrogen oxides when their oxygen storage capability is already exhausted and an exhaust-gas sensor, which is mounted rearward of the catalytic converter, indicates an oxygen excess. The time delay between the reactions of both exhaust-gas sensors after a changeover from rich to lean mixture therefore supplies no statement for NOx storage catalytic converters as to their NOx storage capability.

SUMMARY OF THE INVENTION

It is an object of the invention to provide a method and an arrangement for evaluating the NOx storage capability of an NOx storage catalytic converter, which can be realized with components, which are already available in modern motor vehicles such as oxygen-sensitive exhaust-gas sensors forward and rearward of the catalytic converter.

An embodiment of the invention is for a method of diagnosing a catalytic converter arranged in the exhaust-gas system of an internal combustion engine. The catalytic converter is configured to have an oxygen storage capability and a nitrogen oxide storage capability. The method includes the steps of: providing and mounting a signal-emitting exhaust-gas probe rearward of the catalytic converter; repeatedly increasing and decreasing the oxygen concentration of the exhaust gas forward of the catalytic converter in such a manner that the signal of the exhaust-gas probe changes to reflect the increase and decrease of the oxygen concentration; detecting a first phase shift between a decrease of the oxygen concentration and a subsequent reaction of the exhaust-gas probe and detecting a second phase shift between a subsequent increase in said oxygen concentration and a subsequent reaction of the exhaust-gas probe; determining the difference between the first and second phase shifts; and, outputting and/or storing a fault signal when this difference does not reach a pregiven threshold.

The invention is based on the situation that an oxygen deficiency in the exhaust gas rearward in the catalytic converter only occurs when the oxygen-storage locations as well as the nitrous oxide storage locations in the NOx storage catalytic converter are empty. If the catalytic converter is first filled with oxygen and nitrogen oxides, for example, because of an operation of the engine with a lean mixture, and if hydrocarbons (HC) and carbon monoxide (CO) are generated in the exhaust gas for the regeneration of the catalytic converter because of a rich mixture adjustment, then the following processes take place: the hydrocarbons and the carbon monoxide reduce the stored nitrogen oxides. The oxygen stored and bonded in the form of nitrous oxides is released with the remaining oxygen stored in the catalytic converter so that the oxygen excess is at first maintained rearward of the catalytic converter.

The exhaust-gas sensor, which is arranged rearward of the catalytic converter, reacts only to the oxygen deficiency forward of the catalytic converter when the oxygen storage locations as well as the nitrous oxide storage locations of the catalytic converter are empty. The time delay between influencing the exhaust gas forward of the catalytic converter by introducing reduction agents and the reaction of the rearward exhaust-gas probe is therefore dependent upon the sum of the oxygen storage capability and the NOx storage capability and can therefore be principally used for evaluating the NOx storage capability as a diagnostic criterion. However, a portion of the above-mentioned time delay is caused by the oxygen storage capability. A further object of the invention is to quantitatively detect this portion and to consider the same in the determination of the NOx storage capability.

A conventional oxygen-sensitive lambda probe or, for example, an HC sensor can be utilized as a sensor which is mounted rearward of the catalytic converter. The invention is not limited to a rich control of the engine for making HC and CO available in the exhaust gas as reducing agents. The reducing agent can also be metered in a controlled manner from other sources such as urea from a supply tank.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
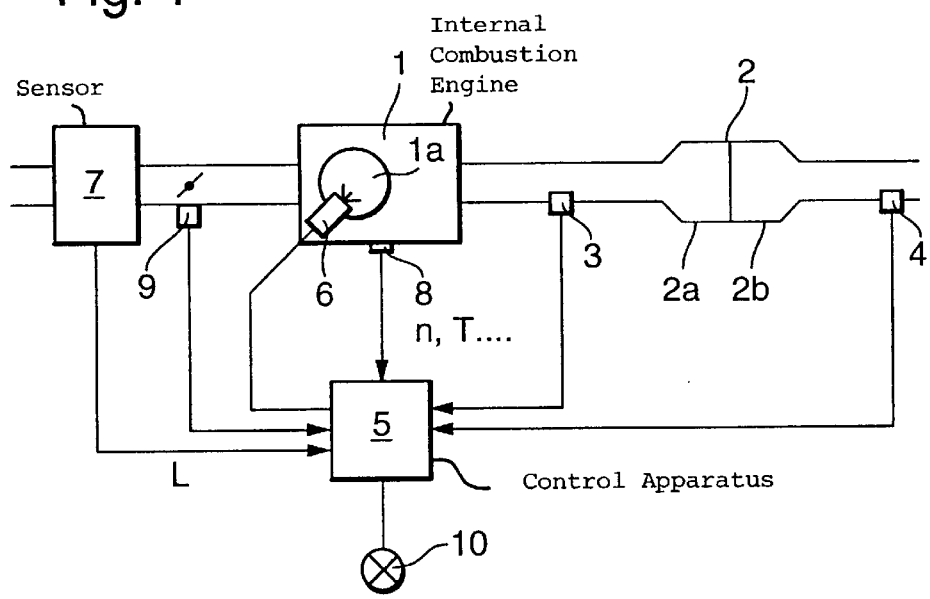
FIG. 1 shows the technical background in which the invention is effective.

FIG. 1 shows an internal combustion engine 1 having a catalytic converter 2, exhaust-gas probes 3 and 4, a control apparatus 5, a fuel-metering device 6 and different sensors 7, 8 and 9. The sensors are for load L and the rpm (n) as well as additional operating parameters of the engine, as may be required, such as temperatures, throttle flap position, et cetera. The catalytic converter includes a first part 2a and a second part 2b. Part 2a defines the NOx-storage catalytic converter. Part 2b represents a NOx-storage catalytic converter having an integrated oxygen storage capability or a downstream oxygen storage 3-way catalytic converter.

The control apparatus forms, inter alia, fuel-metering signals from the above-mentioned input signals and, if required, other input signals. The fuel-metering means 6 is driven with these fuel-metering signals. The fuel-metering means 6 can be configured for a so-called intake manifold injection as well as for a gasoline direct injection into the combustion chambers 1a of the individual cylinders. The variation of the mixture composition can take place via a change of the injection pulsewidth with which the fuel-metering means is driven.

With the above background, the essence of the method of the invention concerns mostly the following: the control apparatus 5, the exhaust-gas probe 4, which is mounted rearward of the catalytic converter, and the means 10 for displaying and/or storing a statement as to the storage capability.

Figure 2A:
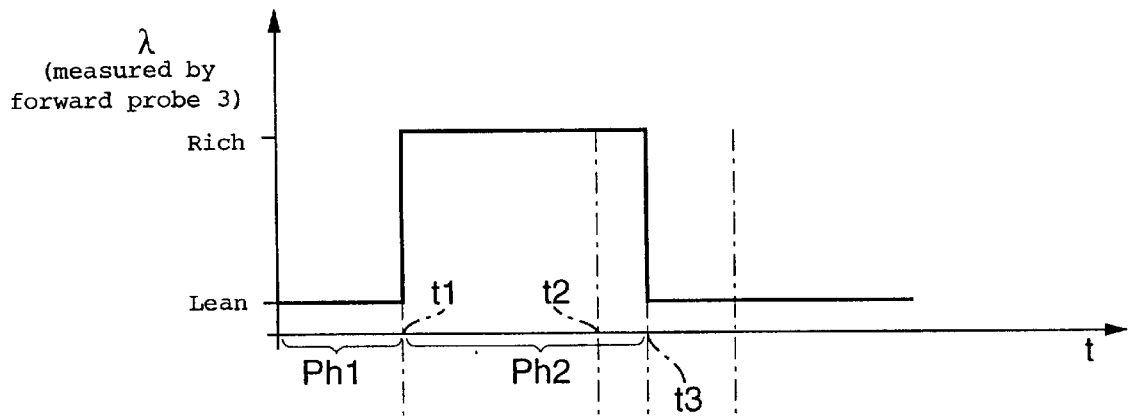
FIGS. 2a and 2b show signal traces for explaining the invention.

FIG. 2a shows the change in the mixture composition forward of the catalytic converter in combination with the signal Ush of the rearward exhaust-gas probe 4 (FIG. 2b) for an embodiment of the invention.

Figure 2B:
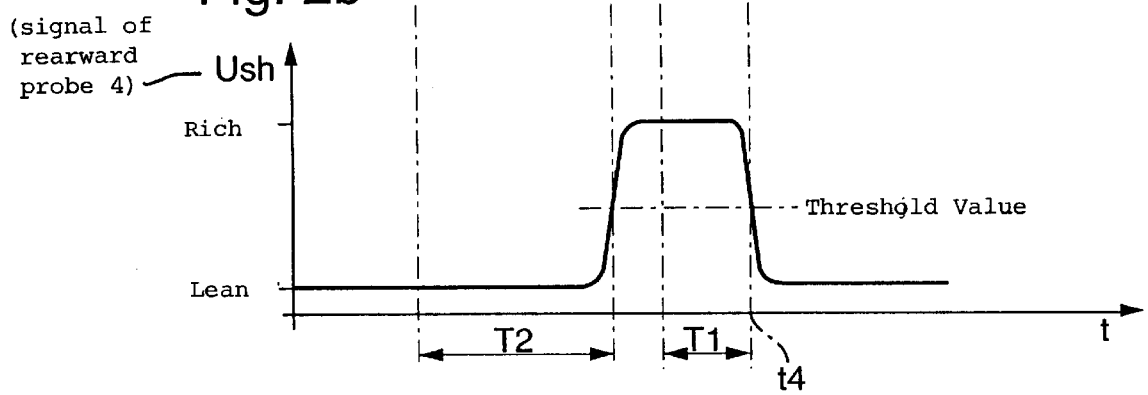

In a first phase Ph1, the engine is driven with $\lambda>1$, that is, with an excess of air. The low signal level of the rearward probe in FIG. 2b shows that air or oxygen excess is present also rearward of the catalytic converter 2. At time point t1, the mixture composition is switched over from $\lambda>1$ to $\lambda<1$, that is, to oxygen deficiency. In this way, t1 marks the start of phase Ph2 having a rich mixture composition. At time point t2, the rearward sensor 4 reacts to the oxygen deficiency with an increase of the signal from a low level to the high level. Thereupon, at time point t3, the rich phase Ph2 is ended and a reversal occurs again to the lean mixture (phase Ph1). Time points t2 and t3 can coincide. At time point t4, the excess of oxygen, which is emitted in the lean phase, occurs rearward of the catalytic converter and causes the signal of the rearward probe to drop to the low signal level characteristic to the lean mixture.

According to the invention, the phase shifts are formed between the increasing and falling flanks of the signal, that is, T2=t3−t1 and T1=t4−t2. The difference T2NOx=T2−T1 is, according to the invention, viewed as an index number for the NOx storage capacity of the catalytic converter system.

The invention is based on the following relationship: two oxygen binding processes occur with the storage. First, oxygen in the form of nitrogen oxides is stored in the catalytic converter, that is, the oxygen is stored bonded to nitrogen. Second, a direct storage of oxygen takes place. The regeneration time T2 (oxygen decay) is determined by both processes from the start of the rich phase to the reaction of the rearward probe. The reducing substances HC and CO act to a certain extent on both forms of the stored oxygen.

The time T1 between the end of the rich phase and a lean reaction of the probe (oxygen excess) is clearly defined by the filling of the NOx storage with oxygen. The NOx storage is not yet full at the time of the lean reaction. In the time T1, the catalytic converter is filled with oxygen and partially with nitrogen oxides. At first, the oxygen storage as well as the NOx storage are empty. For a lean exhaust gas, oxygen and NOx are stored, that is, both storages are filled.

The oxygen storage becomes filled more rapidly. For a full oxygen storage, oxygen can be measured rearward of the storage, which can be shown by the lean reaction after a previous oxygen deficiency signal of the rearward probe. The time T1 between the start of the oxygen excess forward of the catalytic converter and the determination of the oxygen excess rearward of the catalytic converter can be shown with the oxygen storage quantity/magnitude for otherwise constant conditions. Stated otherwise, T1 is an index number for the oxygen storage capability.

The time T2 starts with an oxygen deficiency, that is, with a reducer in the exhaust gas (rich phase Ph2). The reducer consumes the entire oxygen which the catalytic converter supplies. This oxygen emanates from the above-mentioned two processes. Quantity as a function of time can be shown for otherwise like conditions. The time T2 as the time between the start of the rich phase and the detection of the oxygen deficiency/HC excess rearward of the catalytic converter can therefore be shown with a total oxygen quantity. This quantity comprises two component quantities which, in turn, can be shown as two fictitious component times T2NOx and T2O. In this way, T2NOx corresponds to the fictitious time for emptying the NOx storage without emptying the oxygen storage. In the same manner, T2O corresponds to the time for a fictitious emptying of the oxygen storage without participation of the NOx storage.

That is:

$$T2=T2NOx+T2O$$

T2O must be equal to T1 when the quantities are the same because, to a certain extent, the times define the emptying and filling with the same quantity.

Accordingly:

$$T2-T1=T2NOx$$

Stated otherwise, the oxygen storage influence can be eliminated by the difference formation of the times T1 and T2 accessible to the measurement. The result of the difference formation defines an index for the NOx storage capability.

Stated otherwise, the difference T2NOx of the phase shifts of the time T is a quantity suitable for quantitative evaluation. As can be seen in FIG. 2b, the times t2 and t4 can, for example, be determined by threshold passthroughs of the signal of the rearward probe.

The time points t1 and t3 can be detected directly in the control apparatus. With an abrupt reversal of lambda, t1 is the time point starting at which the injection pulsewidths are increased and t3 is the time point starting at which the injection pulsewidths are again reduced. In this case, t1 and t3 are still burdened with the inaccuracy of the gas-running time between the start of injection and the point at which the combustion products reach the catalytic converter. This time is however short compared to the time T and can therefore be neglected in the first approximation. Furthermore, this time drops out in the formation of the difference. Alternatively, the time point of the signal level change of the forward exhaust-gas probe 3 can be used to determine t1 and t3.

Figure 3:
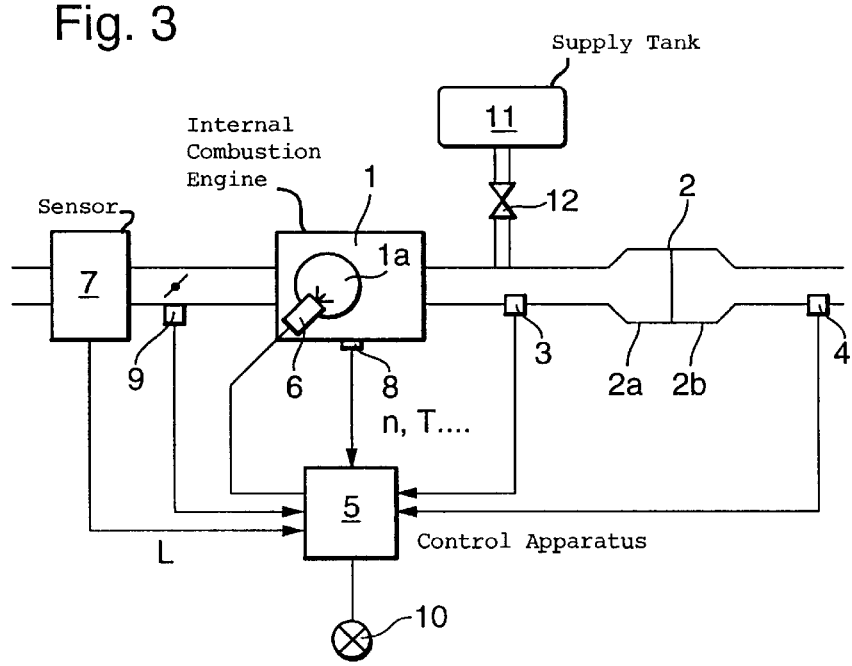
FIG. 3 is a further embodiment of an arrangement which is suitable for carrying out the invention.

The illustrated change of the mixture composition leads to the situation that the engine emits hydrocarbons and carbon monoxide as reducers. Alternatively to the emission of a reducing-effective exhaust-gas component, the reducer can also be supplied to the exhaust gas forward of the catalytic converter from a supply tank 11 via a valve 12 driven by the control apparatus 5. The engine can then be operated continuously with a lean mixture. A corresponding modification of the structure of FIG. 1 is shown in FIG. 3.

FIGS. 4a to 4c and 5a to 5c make clear with respect to signal traces how the invention can be embedded in an open-loop or closed-loop control of the metering of fuel of an engine in combination with an NOx-storage catalytic converter.

The engine is alternately operated in first phases Ph1 with a fuel-poorer (lean) mixture compared to the stoichiometric mixture composition (lambda=1) and, in second phases Ph2, with a fuel-richer mixture. In the first phases, the NOx catalytic converter stores the NOx emissions of the engine. In the second phases, a definite enrichment regenerates the storage catalytic converter. The regeneration takes place via a reduction of the stored nitrates to nitrogen ($N_2$). In order to attain high storage rates and converting rates of the NOx storage catalytic converter, the storage 2a must be almost completely emptied and therefore adequate amounts of reducer must be supplied.

Figure 4A:
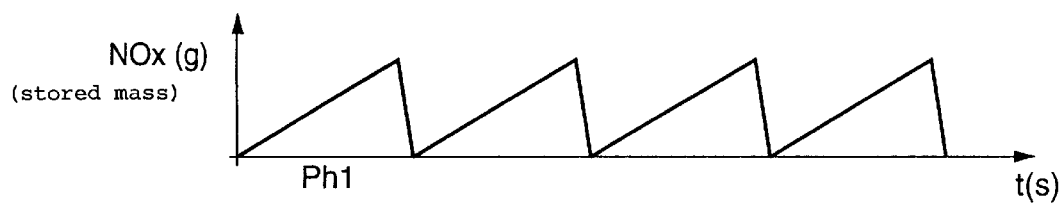
FIGS. 4a to 4c and FIGS. 5a to 5c explain the invention in the context of signal traces in combination with an open-loop or closed-loop control of the metering of fuel of an internal combustion engine having an NOx storage catalytic converter; and, FIG. 6 shows an embodiment of the method of the invention in the context of a flowchart.
Figure 4B:
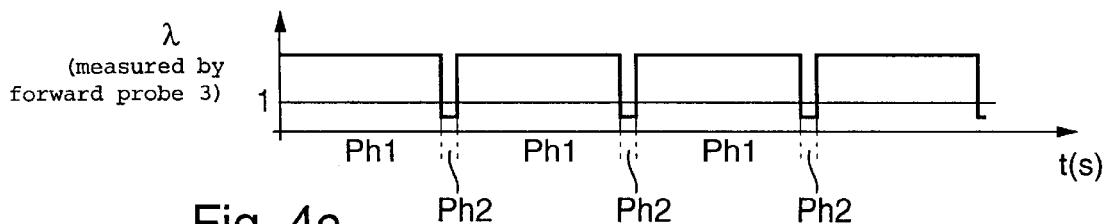
Figure 4C:
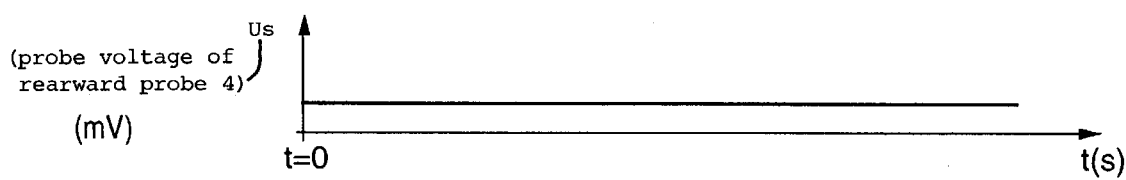

FIGS. 4a to 4c show the phase change in combination with the following. FIG. 4a shows the stored NOx quantity and FIG. 4b shows the corresponding air/fuel ratio lambda as it is detected by the exhaust-gas probe 3 mounted forward of the catalytic converter. FIG. 4c shows the signal trace of the exhaust-gas probe 4 arranged rearward of the catalytic converter for the ideal case. FIG. 4c shows the complete charge and the complete emptying of the NOx-storage catalytic converter.

At time point t=0, the NOx-storage catalytic converter is empty. The engine is operated with a lean mixture (lambda>1) in the following first phase Ph1. The nitrogen oxides which are then emitted are stored in the storage catalytic converter. The first phase (lean phase) is ideally ended when the storage catalytic converter is full. The second phase Ph2 follows the first phase and the storage catalytic converter is regenerated in this second phase. In the embodiment shown, the regeneration takes place with the aid of a rich engine operation in the phase Ph2. Here, the engine, which operates with a fuel-rich mixture, emits unburned HC and CO as reducers. Under the action of the catalytic converter, reducers react with the stored nitrogen oxides to form water, $CO_2$ and $N_2$ which are transported farther with the exhaust gas. The storage is then again made receptive for nitrogen oxides, that is, the storage is regenerated. The control apparatus 5 causes a reversal in a continuous change between the phases Ph1 and Ph2.

In the ideal case, the regeneration (phase Ph2) takes place up to the complete emptying of the storage catalytic converter 2a and ends before excessive quantities of reducer appear rearward of the catalytic converter. The occurrence of excessive reducers is associated with oxygen deficiency and can therefore be detected by an oxygen-sensitive exhaust-gas sensor 4. As an alternative, excessive hydrocarbons can also be detected directly with an HC sensor in lieu or as a supplement to the oxygen-sensitive exhaust-gas sensor 4. According to FIG. 4a, the storage catalytic converter is completely empty after each end of a rich phase Ph2 and in accordance with FIG. 4c, the signal trace of the exhaust-gas probe 4, which is arranged rearward of the catalytic converter, does not change. The shown low level of the signal sensor represents an oxygen excess and therefore the lean operation of the engine. This lean operation is mostly consumption optimized in time average.

An exact computation of the required quantity of reducer in engine operation is not possible. For this reason, the catalytic converter 2 advantageously has the integrated or downstream-connected oxygen storage 2b which acts as a buffer. An impermissibly high supply of reducer CO and HC reacts with the oxygen stored in the oxygen storage 2b. The downstream-connected oxygen storage is ideally emptied only to one half by the excess reducer. The downstream-connected oxygen storage permits a certain overdosage of the reducer which is advantageous to ensure the complete emptying of the storage catalytic converter 2a. The sought-after emptying of the oxygen storage to one half makes a compensation of the metering inaccuracies possible, which are unavoidable in real operation.

Figure 5A:
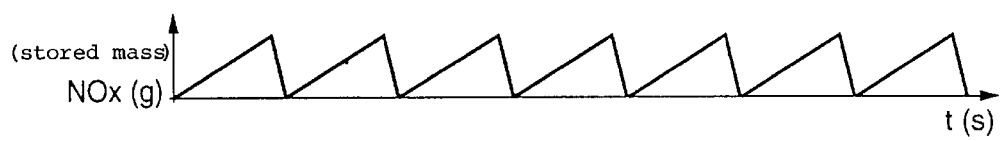
Figure 5B:
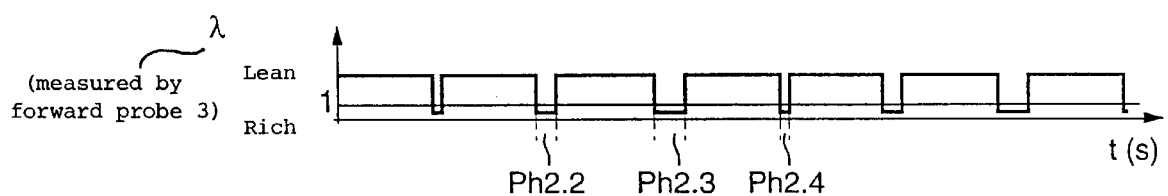
Figure 5C:
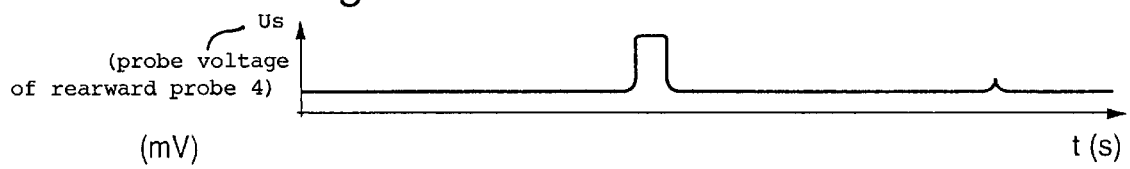

FIGS. 5a to 5c show an embodiment of the invention which is a modification of the embodiment shown in FIGS. 4a to 4c.

As shown in FIG. 5b, the control of the engine first takes place in that the sensor 4, which is mounted rearward of the catalytic converter, does not change its signal behavior and remains at a level characteristic for a lean mixture. This can mean that the length of the rich phases is already optimal. That is, the length corresponds to the requirement (except for inaccuracies in metering which are buffered by the oxygen-storage catalytic converter 2b) so that the storage catalytic converter 2a is completely regenerated. However, it can also be that the length of the rich phases is not sufficient for a complete regeneration of the storage catalytic converter. For this reason, the length of the rich phases is successively increased in a sequence of tests. At the end of the third rich phase Ph2.3, the reducer input into the catalytic converter system 2 exceeds the amount which is pregiven by the regeneration requirement 2a plus the buffer requirement 2b so that an oxygen deficiency in combination with an excess of reducers such as CO and HC occurs rearward of the catalytic converter.

FIG. 5c shows the resulting change of the signal performance of the exhaust-gas sensor 4 which can be detected, for example, by a threshold value comparison.

The rich phase Ph2.3 corresponds to the triggering of the signal change. The rich phase Ph2.3 is therefore just too long in order to be buffered by the catalytic converter system 2; whereas, the previous rich phase Ph2.2 was not long enough in order to trigger a reaction. The actual requirement of reducer is therefore resolvable to an extent which is determined by the stepwidth of the successive lengthenings.

The subsequent rich phases Ph2.4 et cetera are shortened. The extent of the shortening is so dimensioned that the storage catalytic converter 2a is still always completely regenerated, however, the oxygen-storage catalytic converter 2a is emptied only up to approximately one half. Thereafter, the method is repeated and the rich phases are therefore again successively lengthened. The lengthening must, however, not be immediately started. It is also conceivable to store the value, which is determined as being optimal, for the actual operating point and to start a new adaptation operation only after the occurrence of specific conditions, like after the elapse of a certain time.

As an alternative to successive lengthening of the rich phases, a successive increase of the degree of enrichment can be carried out. Both alternatives can also be combined.

The reducer quantity, which is supplied up to the reaction of the rearward sensor at time point t2, is dependent upon the total storage capability of the catalytic converter system. In an alternative to the detection of the times T1, T2, the quantity of reducer supplied in the phase Ph2 can be detected and be set into relationship to the oxygen input in the phase T1. From this quantity of reducer, that quantity of reducer is to be subtracted, which is equivalent to the oxygen input in the phase T1. The result is then likewise an index number for the nitrogen oxide storage capability. This index number can then be compared to a threshold value. The greater the index number, the greater is the NOx storage capability of the catalytic converter.

With a supply of the reducer in accordance with FIG. 3, the quantity of reducer can be determined, for example, from the drive signal of the valve 12. With an emission of reducing-effective exhaust-gas components, the quantity can be determined, for example, from the signal of the forward probe 3 and the intake air quantity. Here, the intake air quantity provides the total gas flow into the catalytic converter and the exhaust-gas signal supplies a signal as to the portion of the reducer. The relationships between the quantity of reducer, sensor signal and air quantity can, for example, be determined by experiments and be stored in a characteristic field in the control apparatus 5. In the same manner, the oxygen input in the phase T1 can be determined from the total gas flow and its portion of oxygen, which can be derived from the signal of the forward probe.

Figure 6:
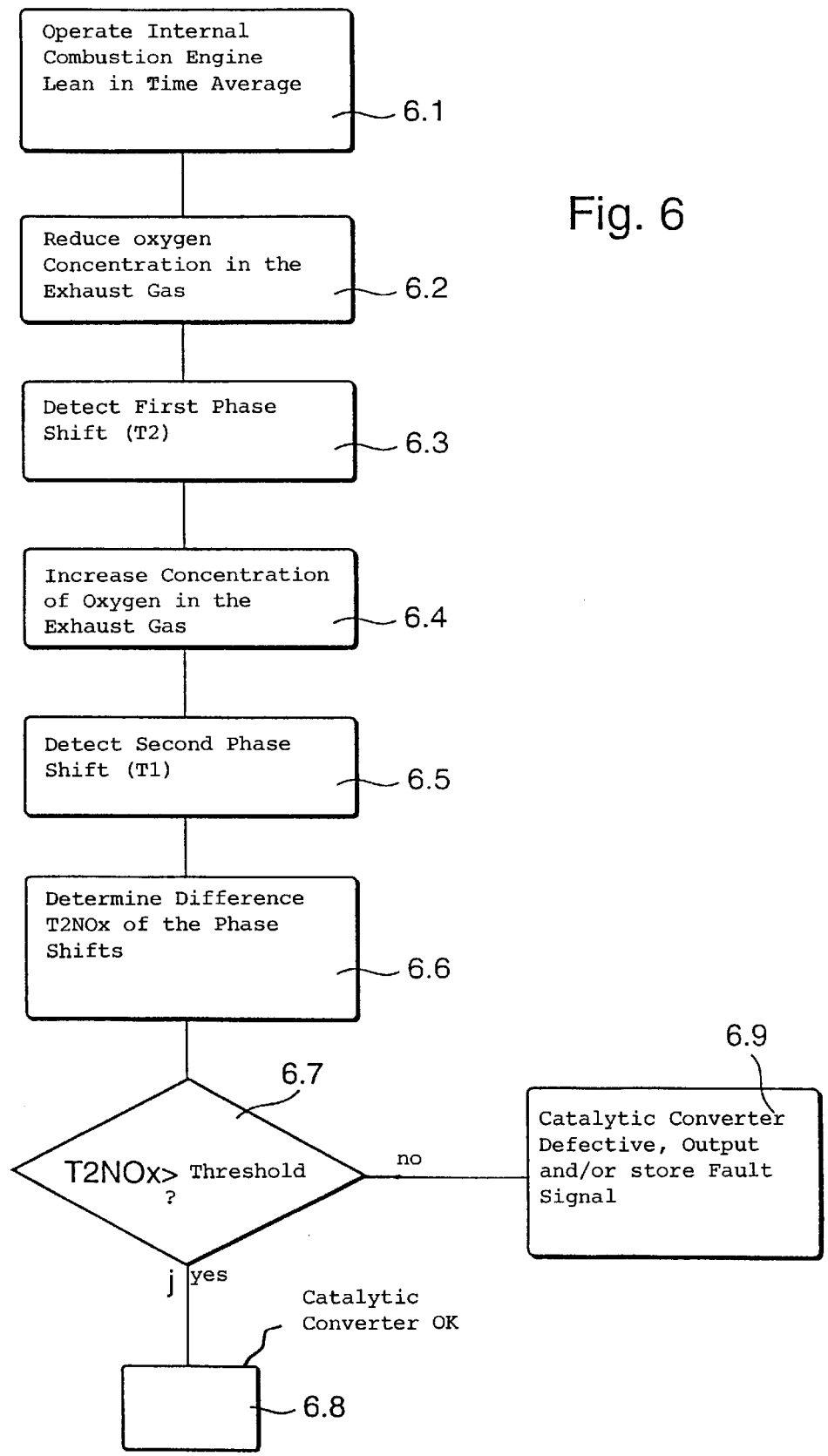

The flowchart of FIG. 6 defines the sequence of this embodiment.

It is understood that the foregoing description is that of the preferred embodiments of the invention and that various changes and modifications may be made thereto without departing from the spirit and scope of the invention as defined in the appended claims.

What is claimed is:

1. A method of diagnosing a catalytic converter arranged in the exhaust-gas system of an internal combustion engine, the catalytic converter being configured to have an oxygen storage capability and a nitrogen oxide storage capability, the method comprising the steps of:

providing and mounting a signal-emitting exhaust-gas probe rearward of said catalytic converter;

repeatedly increasing and decreasing the oxygen concentration of the exhaust gas forward of said catalytic converter in such a manner that the signal of said exhaust-gas probe changes to reflect the increase and decrease of said oxygen concentration;

detecting a first phase shift between a decrease of said oxygen concentration and a subsequent reaction of said exhaust-gas probe and detecting a second phase shift between a subsequent increase in said oxygen concentration and a subsequent reaction of said exhaust-gas probe;

determining the difference between said first and second phase shifts; and, outputting and/or storing a fault signal when said difference does not reach a pregiven threshold.

2. The method of claim 1, comprising the further step of changing said oxygen concentration in the exhaust gas by varying the mixture ratio of the air/fuel ratio supplied to said engine.

3. The method of claim 1, comprising the further step of changing said oxygen concentration in the exhaust gas by adding a reducing agent to the exhaust gas forward of said catalytic converter.

4. The method of claim 1, comprising the further step of alternately operating said engine in a first phase with a mixture, which is lean on fuel compared to the stoichiometric mixture composition, and in a second phase with fuel richer mixture all while controlling the air/fuel ratio of said engine.

5. An arrangement of diagnosing a catalytic converter arranged in the exhaust-gas system of an internal combustion engine, the catalytic converter being configured to have an oxygen storage capability and a nitrogen oxide storage capability, the arrangement comprising:

a signal-emitting exhaust-gas probe mounted rearward of said catalytic converter;

means for increasing and decreasing the oxygen concentration of the exhaust gas forward of said catalytic converter;

means for detecting a first phase shift between a decrease of said oxygen concentration and a subsequent reaction of said exhaust-gas probe and a second phase shift between a subsequent increase in said oxygen concentration and a subsequent reaction of said exhaust-gas probe; and, means for evaluating the difference between said first and second phase shifts to determine the nitrogen oxide storage capability of said catalytic converter.

6. The arrangement of claim 5, further comprising means for outputting and/or storing a fault signal when said difference does not reach a pregiven threshold.

7. The arrangement of claim 5, wherein said exhaust-gas probe is sensitive to oxygen.

8. The arrangement of claim 5, wherein said exhaust-gas probe is a first exhaust-gas probe which outputs a first signal and wherein said arrangement further comprises:

a second exhaust-gas probe outputting a second signal and being mounted forward of said catalytic converter; and, means for detecting said phase shifts as an elapsed time between said first and second signals.

9. The arrangement of claim 5, further comprising means for adding a reducing agent to the exhaust gas forward of said catalytic converter to reduce said oxygen concentration.

* * * * *